US011516352B2

(12) United States Patent
Nagahara (10) Patent No.: US 11,516,352 B2
(45) Date of Patent: Nov. 29, 2022

(54) PRINTING APPARATUS THAT ACQUIRES AN INCOMING ANGLE AND DIRECTION OF A SIGNAL STRENGTH FROM ANOTHER APPARATUS AND PERFORMS PRINTING PROCESS BASED ON THE ACQUIRED SIGNAL STRENGTH, INCOMING ANGLE AND DIRECTION

(71) Applicant: CANON KABUSHIKI KAISHA, Tokyo (JP)

(72) Inventor: Ryuji Nagahara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/934,980

(22) Filed: Jul. 21, 2020

(65) Prior Publication Data
US 2021/0037149 A1 Feb. 4, 2021

(30) Foreign Application Priority Data

Jul. 31, 2019 (JP) .............................. JP2019-141360

(51) Int. Cl.
*H04N 1/00* (2006.01)
*H04W 4/80* (2018.01)
*H04N 1/32* (2006.01)

(52) U.S. Cl.
CPC ..... *H04N 1/00217* (2013.01); *H04N 1/00307* (2013.01); *H04W 4/80* (2018.02); *H04N 1/32662* (2013.01)

(58) Field of Classification Search
None
See application file for complete search history.

(56) References Cited

U.S. PATENT DOCUMENTS

| 7,209,708 | B2* | 4/2007 | Hagiwara | H04W 52/288 358/1.14 |
|---|---|---|---|---|
| 2011/0286028 | A1* | 11/2011 | Kinouchi | H04N 1/00307 358/1.14 |
| 2014/0063542 | A1* | 3/2014 | Aoki | G06F 3/1259 358/1.15 |
| 2016/0173711 | A1* | 6/2016 | Sasase | H04N 1/00307 358/1.15 |
| 2016/0360049 | A1* | 12/2016 | Funakawa | H04W 4/80 |
| 2017/0223748 | A1* | 8/2017 | Sumiuchi | H04W 76/34 |
| 2018/0165040 | A1 | 6/2018 | Matsuda | |
| 2019/0325121 | A1* | 10/2019 | Mori | G06F 3/1222 |

* cited by examiner

*Primary Examiner* — Haris Sabah
(74) *Attorney, Agent, or Firm* — Canon U.S.A., Inc. IP Division

(57) ABSTRACT

A printing apparatus acquires an incoming direction and reception strength of a signal received from another apparatus, and performs predetermined processing relating to printing based on the acquired incoming direction and the acquired reception strength.

8 Claims, 7 Drawing Sheets

PRINTING APPARATUS THAT ACQUIRES AN INCOMING ANGLE AND DIRECTION OF A SIGNAL STRENGTH FROM ANOTHER APPARATUS AND PERFORMS PRINTING PROCESS BASED ON THE ACQUIRED SIGNAL STRENGTH, INCOMING ANGLE AND DIRECTION

BACKGROUND

Field

The present disclosure relates to processing related to printing using wireless communication.

Description of the Related Art

There are printing apparatuses, such as multifunctional peripherals and printers, that include a communication function. Such a printing apparatus calculates a distance between the printing apparatus and a mobile terminal based on reception strength of a beacon signal and performs print processing in a case where the calculated distance is shorter than a predetermined distance (United States Patent Application Publication No. 2018/0165040).

In the case where the print processing is performed based on only the distance between the printing apparatus and the mobile terminal calculated based on the reception strength of the beacon signal, however, the print processing may be performed at timing unintended by a user. For example, in a case where the mobile terminal placed on a rear surface side of the printing apparatus with a partition in between starts transmission of a beacon signal, strong reception strength of the beacon signal may be detected by the printing apparatus, and the print processing may be performed at a timing unintended by the user.

SUMMARY

According to one embodiment of the present disclosure, a printing apparatus acquires an incoming direction of a signal received from another apparatus, acquires reception strength of the signal received from the another apparatus, and performs predetermined processing relating to printing based on the acquired incoming direction and the acquired reception strength.

According to another embodiment of the present disclosure, a communication apparatus acquires an incoming direction of a signal received from a printing apparatus, acquires reception strength of the signal received from the printing apparatus, and controls the printing apparatus to perform predetermined processing relating to printing based on the acquired incoming direction and the acquired reception strength.

Further features will become apparent from the following description of exemplary embodiments with reference to the attached drawings.

DESCRIPTION OF THE EMBODIMENTS

An exemplary embodiment of the present disclosure will be described with reference to the drawings. The following exemplary embodiment does not limit the invention according to the scope of claims, and all combinations of the features described in the exemplary embodiment are not necessarily essential to the means for solving the problems of the invention.

Figure 1:
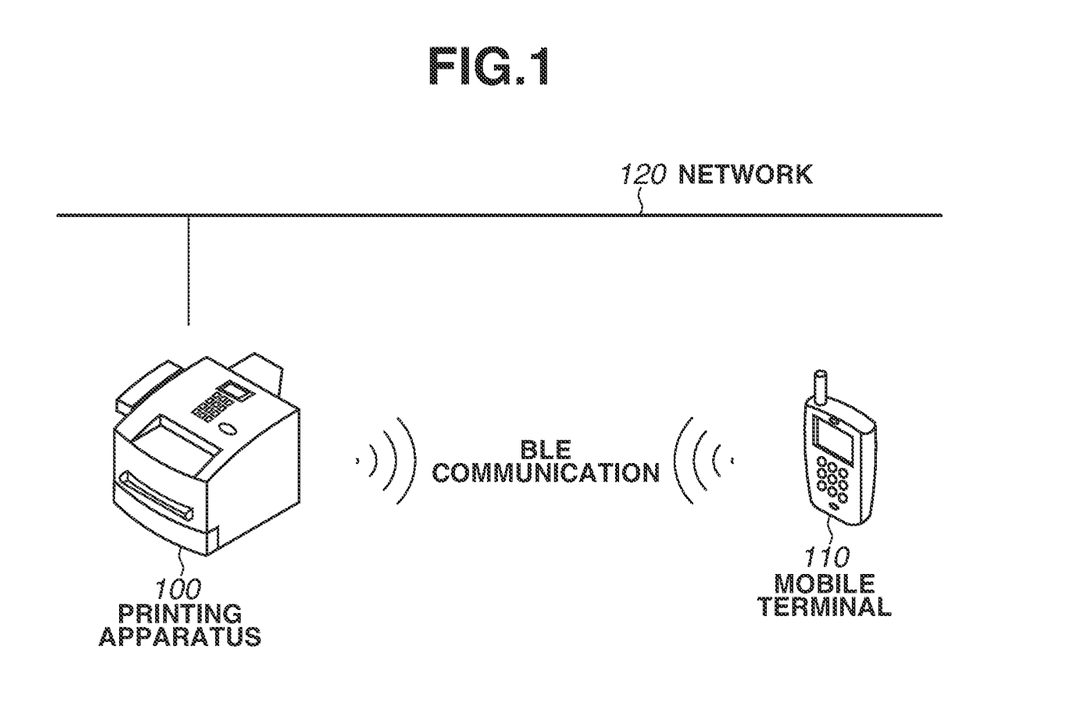
FIG. 1 is a diagram illustrating a network configuration according to one embodiment of the present disclosure.

First, a configuration of a printing system according to a first exemplary embodiment will be described with reference to FIG. 1.

The printing system includes a printing apparatus 100 and a mobile terminal 110, and each of the devices 100 and 110 can perform information notification and bidirectional communication therebetween by a beacon signal through wireless communication based on Bluetooth® low energy system (hereinafter, "BLE communication"). The BLE communication used herein is short-range wireless communication conforming to Institute of Electrical and Electronics Engineers (IEEE) 802.15.1 standard (Bluetooth® standard).

The printing apparatus 100 can advertise a beacon signal including information (e.g., printer identification (ID)) for identification of the printing apparatus 100 to the mobile terminal 110, and can receive advertised information from the mobile terminal 110 by a beacon signal. The mobile terminal 110 can advertise user information (e.g., account information such as user ID) for identification of a user and information on a print job, and can receive information transmitted from the printing apparatus 100. Further, the printing apparatus 100 can receive print data of the user that owns the mobile terminal 110 from a server (not illustrated) via a connected network 120.

The printing apparatus 100 automatically performs predetermined processing when receiving a beacon signal transmitted by the mobile terminal 110 from a direction included in a predetermined range. Hereinafter, the processing to be automatically performed is referred to as automatic execution processing. Further, details of the processing will be described below.

Figure 2:
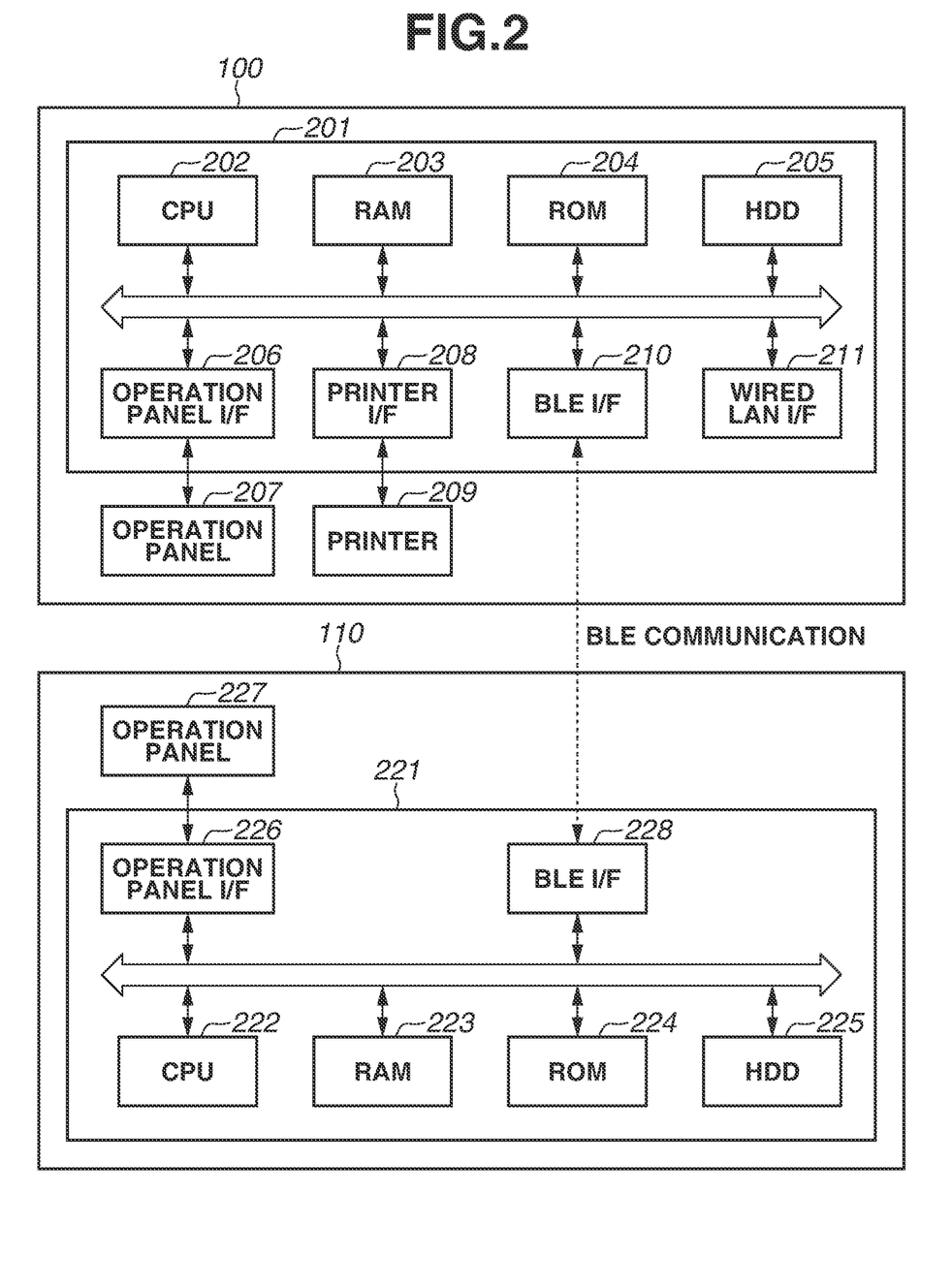
FIG. 2 is a diagram illustrating a hardware configuration according to one embodiment of the present disclosure.

FIG. 2 is a diagram illustrating an example of a hardware configuration of each of the printing apparatus 100 and the mobile terminal 110 according to the present exemplary embodiment.

A control unit 201 including a central processing unit (CPU) 202 controls entire operation of the printing apparatus 100. The CPU 202 includes one or more processors, and performs various kinds of control such as communication control by reading control programs stored in a read-only memory (ROM) 204. The ROM 204 includes one or more memories.

A random access memory (RAM) 203 includes one or more memories, and is used as a main memory of the CPU 202 and a temporary storage area such as a work area. A hard disk drive (HDD) 205 stores data, various kinds of programs, and various kinds of information tables. In the following description, the RAM 203, the ROM 204, and the HDD 205 are collectively referred to as a storage unit of the printing apparatus 100.

An operation panel interface (I/F) 206 connects an operation panel 207 and the control unit 201. Further, a printer I/F 208 connects a printer 209 (printer engine) and the control unit 201. The printer 209 performs print processing on a sheet fed from a sheet feeding cassette (not illustrated) based on print data input via the printer I/F 208.

ABLE I/F 210 is an interface for performing BLE communication, and supports communication conforming to Bluetooth® standard version 5.1.

A network cable is connectable to a wired local area network (LAN) I/F 211, and communication with an external apparatus can be performed via the network cable. The printing apparatus 100 is configured such that the CPU 202 performs processing illustrated in flowcharts described below by using the RAM 203; however, the printing apparatus 100 may have other configuration. For example, the CPU 202 may perform the processing by using an application specific integrated circuit (ASIC).

As the mobile terminal 110, a portable communication apparatus, such as a mobile phone, a smartphone, a personal digital assistance (PDA), a laptop personal computer (PC), and a tablet PC, is assumed. The mobile terminal 110, however, is not limited thereto. A control unit 221 includes a CPU 222 that includes one or more processors and controls entire operation of the mobile terminal 110. The CPU 222 performs various kinds of control, such as communication control, by reading control programs stored in a ROM 224 that includes one or more memories. A RAM 223 including one or more memories is used as a main memory of the CPU 222 and a temporary storage area such as a work area. An HDD 225 stores data, various kinds of programs, and various kinds of information tables. An operation panel I/F 226 connects an operation panel 227 and the control unit 221. In the following description, the RAM 223, the ROM 224, and the HDD 225 are collectively referred to as a storage unit of the mobile terminal 110.

A BLE I/F 228 is an I/F for performing BLE communication, and supports communication conforming to Bluetooth® standard version 5.1 as with the BLE I/F 210.

FIG. 3A to FIG. 5 each illustrate an example of a screen displayed on the operation panel 207 or the operation panel 227 to cause the user to perform setting of the printing apparatus 100 or the mobile terminal 110.

Figure 3A:
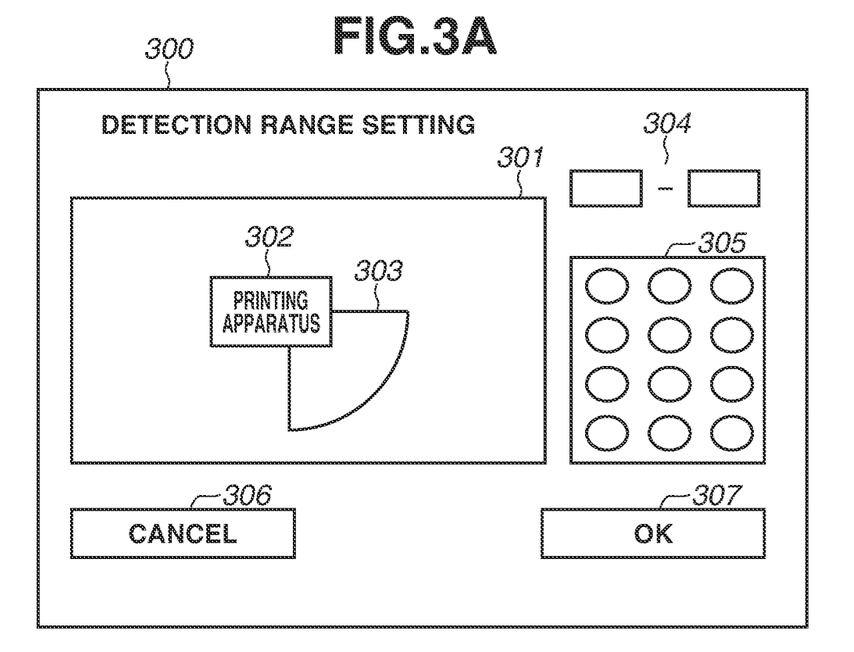
FIGS. 3A and 3B are diagrams each illustrating an example of a user interface (UI) screen according to embodiments of the present disclosure.
Figure 3B:
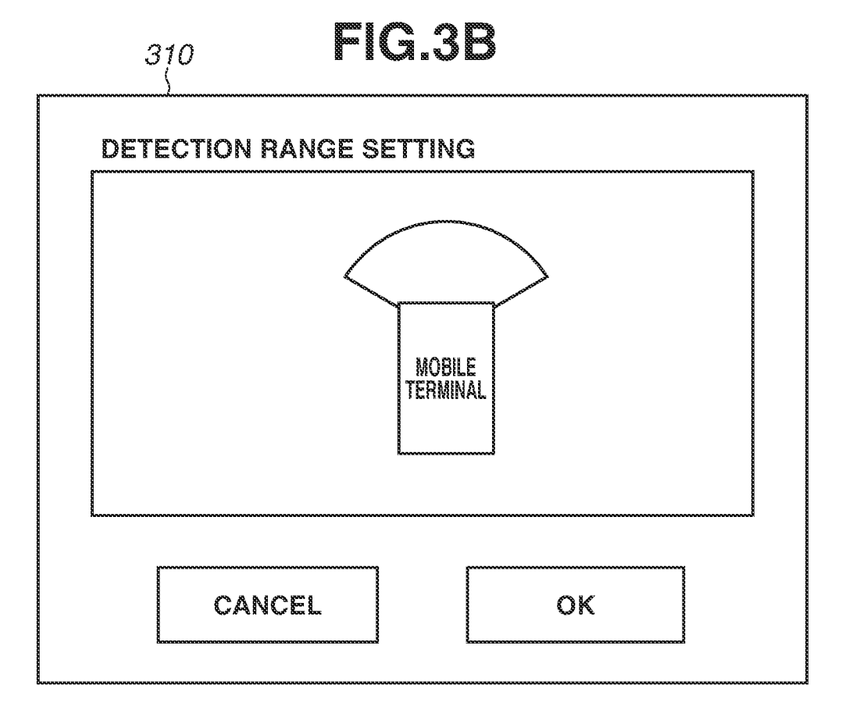

A detection range setting screen 300 in FIG. 3A is an example of a screen displayed in the printing apparatus 100 for setting of a range of a reception direction of a beacon signal that causes execution of the automatic execution processing. A detection range setting screen 310 in FIG. 3B is an example of a screen displayed in the mobile terminal 110 for setting of a range of a reception direction of a beacon signal as a trigger for transmission of a signal that causes the printing apparatus 100 to perform predetermined processing. The signal that causes the printing apparatus 100 to perform the predetermined processing is, for example, a Generic Attribute Profile (GATT) connection request conforming to Bluetooth standard.

A detection range image 301 illustrates a range where processing is performed. A printing apparatus icon 302 indicating the printing apparatus 100 and a detection range 303 indicating a range where the beacon signal is processed are displayed in the detection range image 301. A detection angle input area 304 displays the detection range 303 by numerical values from 0 degrees to 360 degrees. A boundary of the detection range 303 can be changed through swipe operation by the user, and changed content of the detection range by the swipe operation is reflected on the detection angle input area 304 in real time. Further, the user can set the detection angle input area 304 by inputting numerical values using a numerical keypad 305, and the content changed by the numerical keypad 305 is reflected on the detection range 303 in real time. The method of setting the detection angle input area 304 is not limited to the above-described methods. The detection angle input area 304 may support only one of the change by the swipe operation and the change by the numerical keypad 305.

When the user sets the detection range and selects an OK button 307, the printing apparatus 100 processes only a beacon signal received from the direction of the detection range set by the user. To discard the detection range image 301 or the content changed by the numerical keypad 305, the user selects a cancel button 306.

Likewise, the user can also perform setting on the detection range setting screen 310 such that the mobile terminal 110 processes only a beacon signal received from a direction of a detection range set by the user.

Figure 4:
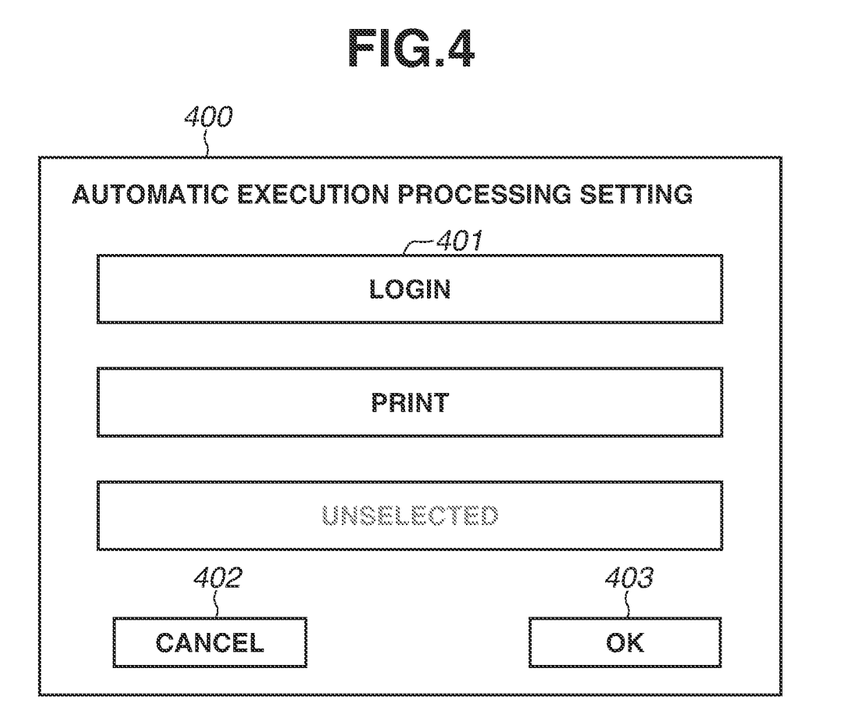
FIG. 4 is a diagram illustrating an example of the UI screen according to one embodiment of the present disclosure.

In an automatic execution processing setting screen 400 illustrated in FIG. 4, the user can set processing to be performed by the printing apparatus 100 when the beacon signal is processed. The user can select processing from a list of processing automatically performable by the printing apparatus 100, in a processing setting area 401.

In a case where "login" is selected, the printing apparatus 100 performs a user authentication (login) function based on user information received by the beacon signal, and makes a transition to a standby state.

The standby state is a state where the operation panel 207 is displayed, and the user can use a print function of the printing apparatus 100. In a case where no operation is performed for a predetermined time in the standby state or in a case where the user presses a power saving button of the operation panel 207, the printing apparatus 100 makes a transition to a sleep state. The sleep state is a state where the printing apparatus 100 does not display the operation panel 207 and the print function is not usable, or a state where use of the print function is limited to reduce power consumption as compared with the standby state and the printing apparatus 100 waits for user operation. When a predetermined user operation or the automatic execution processing is performed in the sleep state, the printing apparatus 100 makes a transition to the standby state.

In a case where "print" is selected, one or more pieces of print job data transmitted to the printing apparatus 100 by the user are collectively printed. At this time, the printing apparatus 100 may acquire one or more pieces of print job data transmitted to a server (not illustrated) by the user, and may collectively print the print job data.

In FIG. 4, only "login" and "print" are illustrated as examples. Selectable processing of the printing apparatus 100 is, however, not limited thereto. Further, selectable processing may be dynamically changed in conjunction with the other setting of the printing apparatus 100. For example, in a case where a user authentication (login) function is set invalid, "login" may be unselectable from the list in the processing setting area 401.

Further, in a case where the login is performed as automatic execution processing, a timeout time before logout may be set short as compared with a case where login is performed by the other method such as near field communication (NFC), a quick response (QR) Code®, an authentication card, and operation on the operation panel 207.

In addition, one or a plurality of processing may be selectable as the automatic execution processing. To reflect the selected automatic execution processing, the user selects an OK button 403. To discard the changed content, the user selects a cancel button 402.

Figure 5:
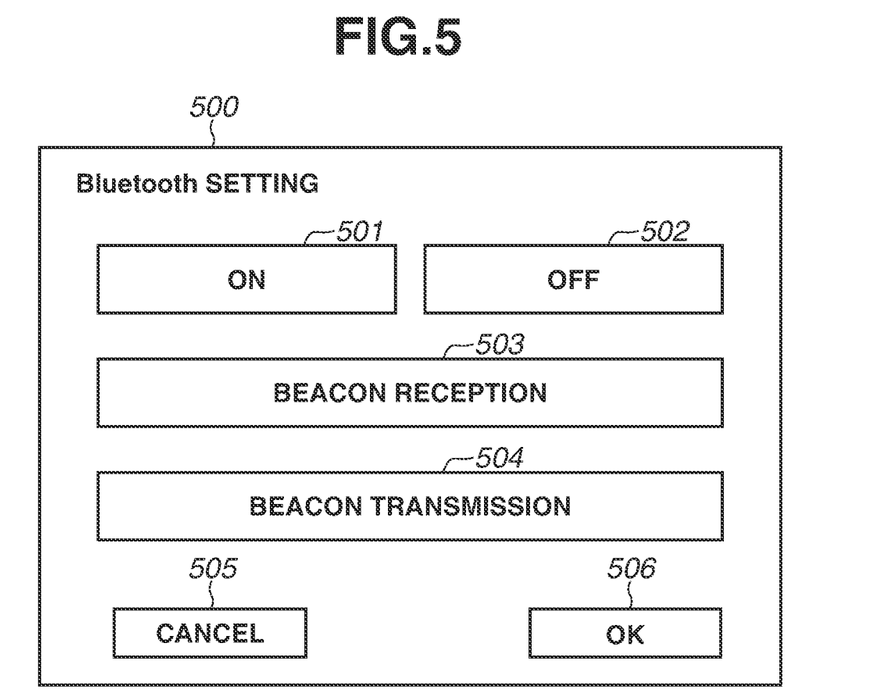
FIG. 5 is a diagram illustrating an example of the UI screen according to one embodiment of the present disclosure.

The user can select a Bluetooth® operation mode in a Bluetooth® setting screen 500 in FIG. 5. The user selects an ON button 501 to perform Bluetooth® communication, whereas the user selects an OFF button 502 not to perform the Bluetooth® communication.

In a case where the user selects the ON button 501, a beacon reception button 503 and a beacon transmission button 504 become selectable for selection of a Bluetooth® operation mode. In a case where the beacon reception button 503 is selected, the printing apparatus 100 starts operation to wait for (scan) a beacon signal transmitted from the mobile terminal 110 at transition to the sleep state. In a case where the mobile terminal 110 approaches from the detection range set in the detection range setting screen 300, the printing apparatus 100 performs the automatic execution processing set in the automatic execution processing setting screen 400.

In contrast, in a case where the beacon transmission button 504 is selected, the printing apparatus 100 starts operation to transmit a beacon signal to the mobile terminal 110. In the case where the mobile terminal 110 approaches from the detection range set in the detection range setting screen 300, the printing apparatus 100 performs the automatic execution processing set in the automatic execution processing setting screen 400.

To reflect the selected Bluetooth® setting, the user selects an OK button 506. To discard the changed content, the user selects a cancel button 505.

Next, operation of the printing apparatus 100 according to the present exemplary embodiment will be described with reference to a flowchart of FIG. 6. The operation of flowchart is realized when the CPU 202 reads and executes the programs stored in the storage units.

Figure 6:
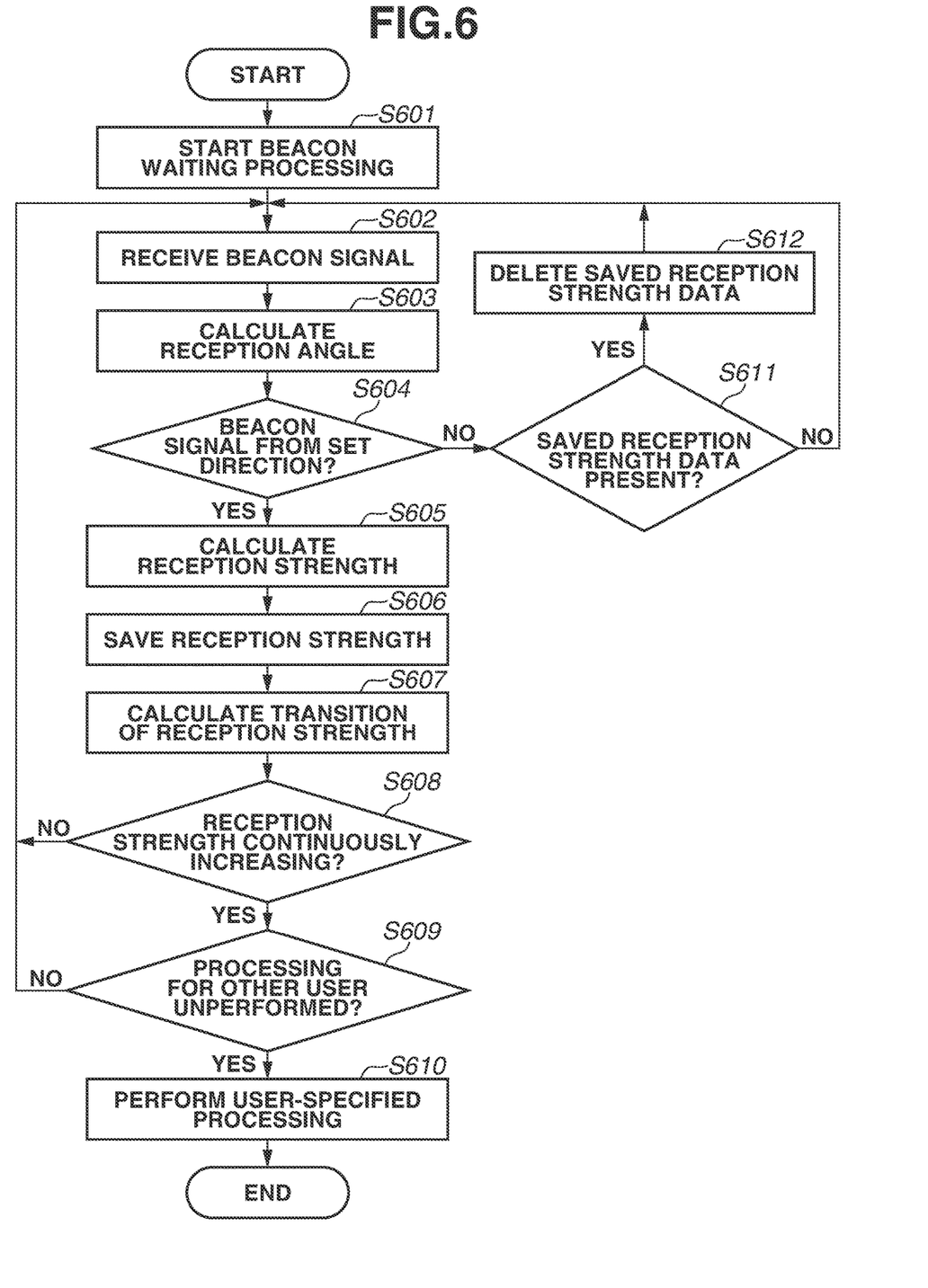
FIG. 6 is a flowchart illustrating processing performed by a printing apparatus according to one embodiment of the present disclosure.

FIG. 6 illustrates a processing flow in which the printing apparatus 100 waits for (scans) a beacon signal in response to selection of the beacon reception button 503 and performs the operation set in the automatic execution processing setting screen 400. The flow is realized when the CPU 202 reads and executes the programs stored in the RAM 203 of the printing apparatus 100. The processing flow in FIG. 6 is selected in response to selection of the beacon reception button 503.

When the beacon reception button 503 is selected, the printing apparatus 100 starts beacon waiting processing in step S601. In a case where the user authentication (login) function is valid, the printing apparatus 100 may not perform the beacon waiting processing in the standby state, and may perform the beacon waiting processing in the sleep state. Upon receiving a beacon signal from the mobile terminal 110 in step S602, the printing apparatus 100 calculates a reception angle (incoming direction) of the beacon signal in step S603.

In step S604, the printing apparatus 100 determines whether the beacon signal is a beacon signal received from the direction of the detection range 303 set in the detection range setting screen 300. In a case where the beacon signal is a beacon signal received from the direction of the detection range 303 (YES in step S604), the processing proceeds to step S605. In step 605, the printing apparatus 100 calculates reception strength (received signal strength indicator (RSSI)) of the received beacon signal. In step S606, the printing apparatus 100 saves (stores) the reception strength of the beacon signal in the RAM 203 in association with user information on the mobile terminal 110. The user information is included in the beacon signal.

In contrast, in a case where the beacon signal is a beacon signal received from outside of the detection range 303 (NO in step S604), the processing proceeds to step S611. In step S611, the printing apparatus 100 determines whether beacon reception strength data associated with the user information on the mobile terminal 110 is present. In other words, the printing apparatus 100 determines whether the reception strength data saved in the RAM 203 in step S606 is present. In a case where the beacon reception strength data associated with the user information is present (YES in step S611), the processing proceeds to step S612. In step S612, the printing apparatus 100 deletes the beacon reception strength data. At this time, the data itself may be deleted from the RAM 203 (updated with zero, etc.), or a flag indicating invalidity may be added to the data. The processing then returns to step S602, and the printing apparatus 100 waits for reception of a beacon signal from the mobile terminal 110.

Return to the description of the processing subsequent to step S606. In step S607, the printing apparatus 100 calculates transition of the saved reception strength of the beacon signal associated with the user information. In step S608, the printing apparatus 100 determines whether the reception strength is increasing. The printing apparatus 100 may determine whether the reception strength is increasing based on only the threshold number of times N indicating that the reception strength is increasing consecutively N times, or based on combination of the threshold number of times and a strength threshold X dBm or more of the reception strength. Further, in steps S607 and S608, it may be determined whether the reception strength is greater than or equal to X dBm for a predetermined number of times in place of the above-described processing. In this case, when the reception strength is greater than or equal to X dBm for a predetermined number of times (YES in step S608), the processing proceeds to step S609. Otherwise (NO in step S608), the processing returns to step S602.

In a case where it is determined that the reception strength of the beacon signal from the mobile terminal 110 is continuously increasing (YES in step S608), then in step S609, the printing apparatus 100 determines whether processing for the other user is unexecuted. Ina case where the processing for the other user is unexecuted (YES in step S609), then in step S610, the printing apparatus 100 performs the operation set in the automatic execution processing setting screen 400. The printing apparatus 100 further notifies the mobile terminal 110 of a processing type (e.g., login or print) of the automatic execution processing and a processing status (e.g., started, under execution, completed). The mobile terminal 110 notifies the user of the status of the automatic execution processing notified from the printing apparatus 100, by display on the operation panel 227 or vibration. Meanwhile, in a case where the processing for the other user is under execution (NO in step S609), the processing returns to step S602, and the printing apparatus 100 waits for reception of a beacon signal from the mobile terminal 110 in order not to prevent the processing under execution. At this time, the printing apparatus 100 may store information indicating that the automatic execution processing for the user of the mobile terminal 110 is put on hold in the RAM 203, and may perform the user-specified processing in the order of detection of approach after completion of the processing for the other user.

Alternatively, the processing in step S609 may be omitted such that the processing proceeds to step S610 after step S608. In this case, the processing flow illustrated in FIG. 6 may not be started while the processing for the other user is under execution.

The printing apparatus 100 can perform the predetermined processing based on the incoming direction and the reception strength of the beacon signal by performing control in the above-described manner. Although the processing relating to the printing apparatus 100 is mainly automatically performed in the above description, the other processing may be automatically performed.

Further, in the above-described exemplary embodiment, a reception angle for one beacon signal is calculated, and reception strength of the beacon is measured. The processing, however, is not limited thereto, and only a reception angle is calculated for a certain beacon signal, and reception strength may be measured in response to reception of another beacon signal. In this case, it is necessary to determine that the beacon signals are transmitted from the same mobile terminal 110, and the printing apparatus 100 refers to address information and user information on a transmission source apparatus included in each of the beacon signals.

In the above-described exemplary embodiment, a beacon signal conforming to Bluetooth® standard has been described as an example. However, the beacon signal is not limited thereto, and a signal such as a beacon signal conforming to IEEE 802.11 series standard (Wi-Fi standard) or fifth generation mobile communication system (5G) may be also used. In this case, a signal (e.g., beacon signal) used for calculation of the reception angle and a signal (e.g., beacon signal) used for measurement of the reception strength may conform to respectively different wireless standards. In this case, it is also determined that the beacon signal is transmitted from the same mobile terminal 110 in a manner similar to the above.

Figure 7:
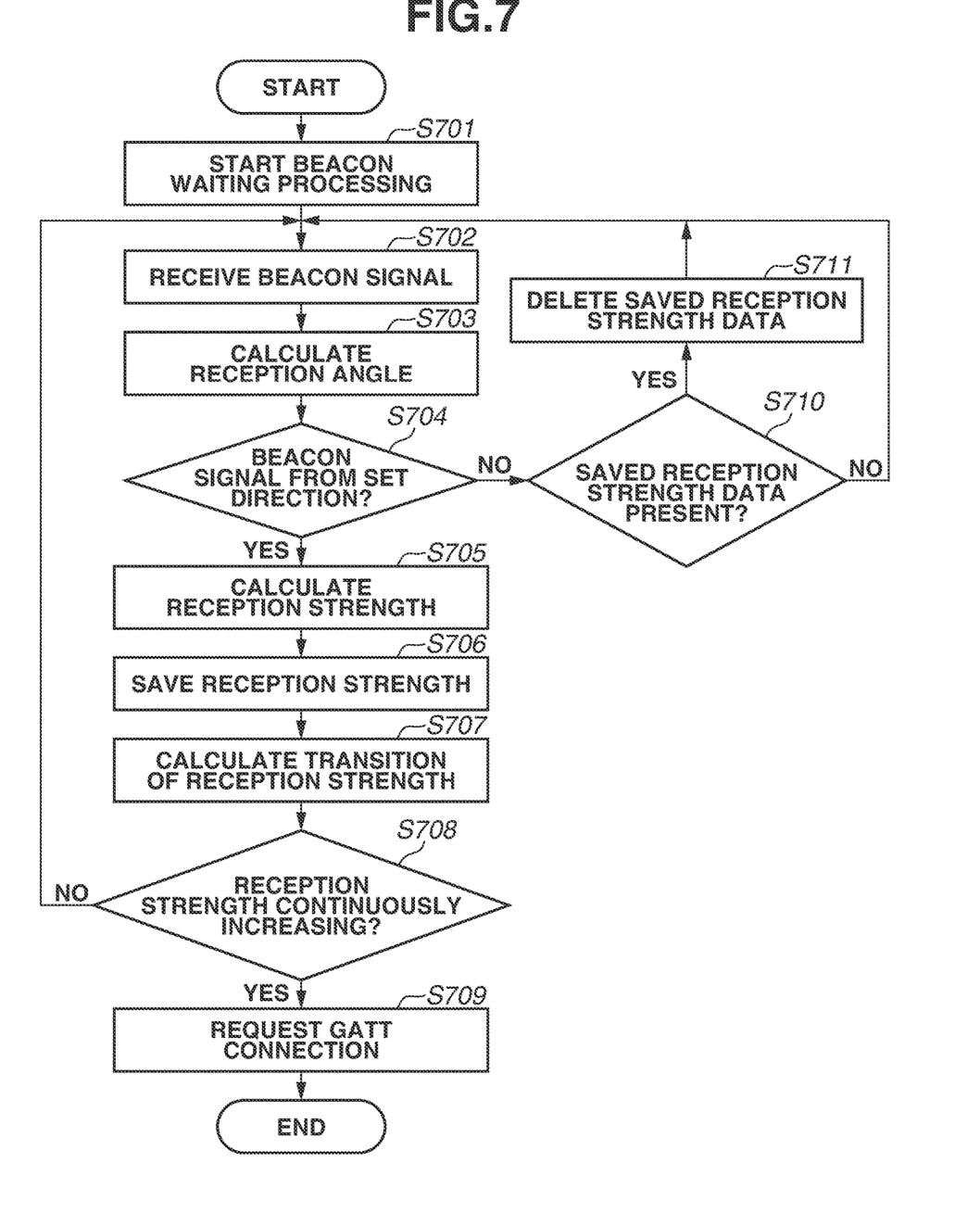
FIG. 7 is a flowchart illustrating processing performed by a mobile terminal according to one embodiment of the present disclosure.

Next, a processing flow to be performed in a case where the mobile terminal 110 waits for (scans) a beacon signal will be described with reference to FIG. 7. The processing flow is realized when the CPU 222 reads and executes the programs stored in the RAM 223 of the mobile terminal 110. The flow is started when the Bluetooth® function of the mobile terminal 110 is set valid by the user.

When the Bluetooth® function is set valid, the mobile terminal 110 starts beacon waiting processing in step S701. Upon receiving a beacon signal from the printing apparatus 100 in step S702, the mobile terminal 110 calculates the reception angle of the beacon signal in step S703, and determines in step S704 whether the beacon signal is a beacon signal received from the direction of the detection range set in the detection range setting screen 310. In a case where the beacon signal is a beacon signal received from the direction of the detection range 303 (YES in step S704), the mobile terminal 110 calculates reception strength (RSSI) of the received beacon signal in step S705. In step S706, the mobile terminal 110 saves the reception strength of the beacon signal in the RAM 223 in association with a printer ID of the printing apparatus 100. In a case where the beacon signal is a beacon signal received from outside of the detection range 303 (NO in step S704), the mobile terminal 110 determines in step S710 whether beacon reception strength data associated with the printer ID of the printing apparatus 100 is present. In a case where the beacon reception strength data associated with the printer ID is present in the RAM 223 (YES in step S710), the mobile terminal 110 deletes the beacon reception strength data in step S711. The processing then returns to step S702.

In step S707, the mobile terminal 110 calculates transition of the saved reception strength of the beacon signal associated with the printer ID. In step S708, the mobile terminal 110 determines whether the reception strength is increasing. A specific method for the determination and alternative methods thereto are similar to the methods in steps S607 and S608. Therefore, the description thereof is omitted.

In a case where it is determined that the reception strength of the beacon signal from the printing apparatus 100 is continuously increasing (YES in step S708), the mobile terminal 110 transmits a GATT connection request to the printing apparatus 100 in step S709. Upon receipt of the GATT connection request, the printing apparatus 100 transmits direct connection information as a response signal. As a result, direct connection conforming to Bluetooth® standard is established between the printing apparatus 100 and the mobile terminal 110.

Further, the mobile terminal 110 transmits a signal for causing the printing apparatus 100 to perform printing, a signal for causing the printing apparatus 100 to perform login processing, or other signals via the established direct connection. Which signal to be transmitted may be determined based on the setting made by the user or may be previously determined. In addition, the printing apparatus 100 may automatically perform the automatic execution processing in response to establishment of the direct connection. Such a configuration also can achieve a similar purpose.

In place of the GATT connection request, the mobile terminal 110 and the printing apparatus 100 may perform direct connection processing conforming to Wi-Fi Direct® standard to establish the direct connection. After the direct connection conforming to Bluetooth® standard is established, the connection may be handed over to Wi-Fi or 5G, and the mobile terminal 110 may transmit a signal for causing the printing apparatus 100 to perform printing, a signal for causing the printing apparatus 100 to perform the login processing, etc., in conformity to Wi-Fi or 5G.

Only in the case where the user having the mobile terminal 110 approaches the printing apparatus 100 from a specific direction, the printing apparatus 100 can perform a predetermined operation by the above-described processing flow. For example, a case where login processing is set as the automatic execution processing and processing of a beacon signal is set to a front surface side of the printing apparatus 100 is assumed. In this case, the printing apparatus 100 starts to return to the standby state at the time of detection of the user approaching from the direction of the front surface side of the printing apparatus 100, which allows the user to use the printing apparatus 100 without time lag, thereby improving the usability of the printing apparatus 100. In contrast, in a case where the user passes by the rear surface of the printing apparatus 100, unintended processing may be inhibited. In such a manner, the operation of the printing apparatus 100 can be controlled based on the layout of an office.

According to the present exemplary embodiment, it is possible to control execution of the processing relating to printing in consideration of the incoming direction of a reception signal.

Various embodiments of the present disclosure can be realized by providing a program for realizing one or more functions of the above-described exemplary embodiment to a system or an apparatus through a network or a storage medium and causing one or more processors of a computer in the system or the apparatus to read and execute the program. Further, various embodiments of the present disclosure can be realized by a circuit (e.g., ASIC) that realizes one or more functions.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-141360, filed Jul. 31, 2019, which is hereby incorporated by reference herein in its entirety.

What is claimed is:

1. A printing apparatus comprising:
one or more processors; and
one or more memories storing instructions that, when executed by the one or more processors, cause the printing apparatus to:
derive an incoming angle at which a signal from another apparatus is received, the signal conforming to Bluetooth® standard;
determine reception strength of the signal; and
perform predetermined processing relating to printing in a case where the derived incoming angle related to the signal is within a predetermined angle range and the determined reception strength related to the signal is greater than a predetermined value,
wherein the predetermined processing is not performed in a case where the derived incoming angle related to the signal is not within the predetermined angle range, even if a reception strength related to the signal is greater than the predetermined value.

2. The printing apparatus according to claim 1, further comprising an interface configured to cause a user to set the predetermined range and/or the predetermined value.

3. The printing apparatus according to claim 1,
wherein the one or more memories store reception strength of each of a plurality of signals received from the another apparatus, and
wherein, in a case where the derived incoming angle related to the signal is within the predetermined range, the printing apparatus performs the predetermined processing based on transition of the reception strength of the plurality of signals stored in the one or more memories.

4. The printing apparatus according to claim 1, further comprising an interface configured to cause a user to set content of the predetermined processing.

5. The printing apparatus according to claim 1, wherein the predetermined processing includes print processing and/or processing for enabling a print function of the printing apparatus based on information included in the signal received from the another apparatus.

6. The printing apparatus according to claim 1, wherein the predetermined processing includes processing for establishing a Generic Attribute Profile (GATT) connection conforming to Bluetooth® standard for communication relating to printing with the another apparatus.

7. A method of controlling a printing apparatus, the method comprising:
deriving an incoming angle at which a signal from another apparatus is received, the signal conforming to Bluetooth® standard;
determining reception strength of the signal; and
performing predetermined processing relating to printing in a case where the derived incoming angle related to the signal is within a predetermined angle range and the determined reception strength related to the signal is greater than a predetermined value,
wherein the predetermined processing is not performed in a case where the derived incoming angle related to the signal is not within the predetermined angle range, even if a reception strength related to the signal is greater than the predetermined value.

8. A non-transitory computer-readable storage medium storing a computer program for causing a computer to execute a method of controlling a printing apparatus, the method comprising:
deriving an incoming angle at which a signal from another apparatus is received, the signal conforming to Bluetooth® standard;
determining reception strength of the signal; and
performing predetermined processing relating to printing in a case where the derived incoming angle related to the signal is within a predetermined angle range and the determined reception strength related to the signal is greater than a predetermined value,
wherein the predetermined processing is not performed in a case where the derived incoming angle related to the signal is not within the predetermined angle range, even if a reception strength related to the signal is greater than the predetermined value.

* * * * *